United States Patent Office 2,781,600
Patented Feb. 19, 1957

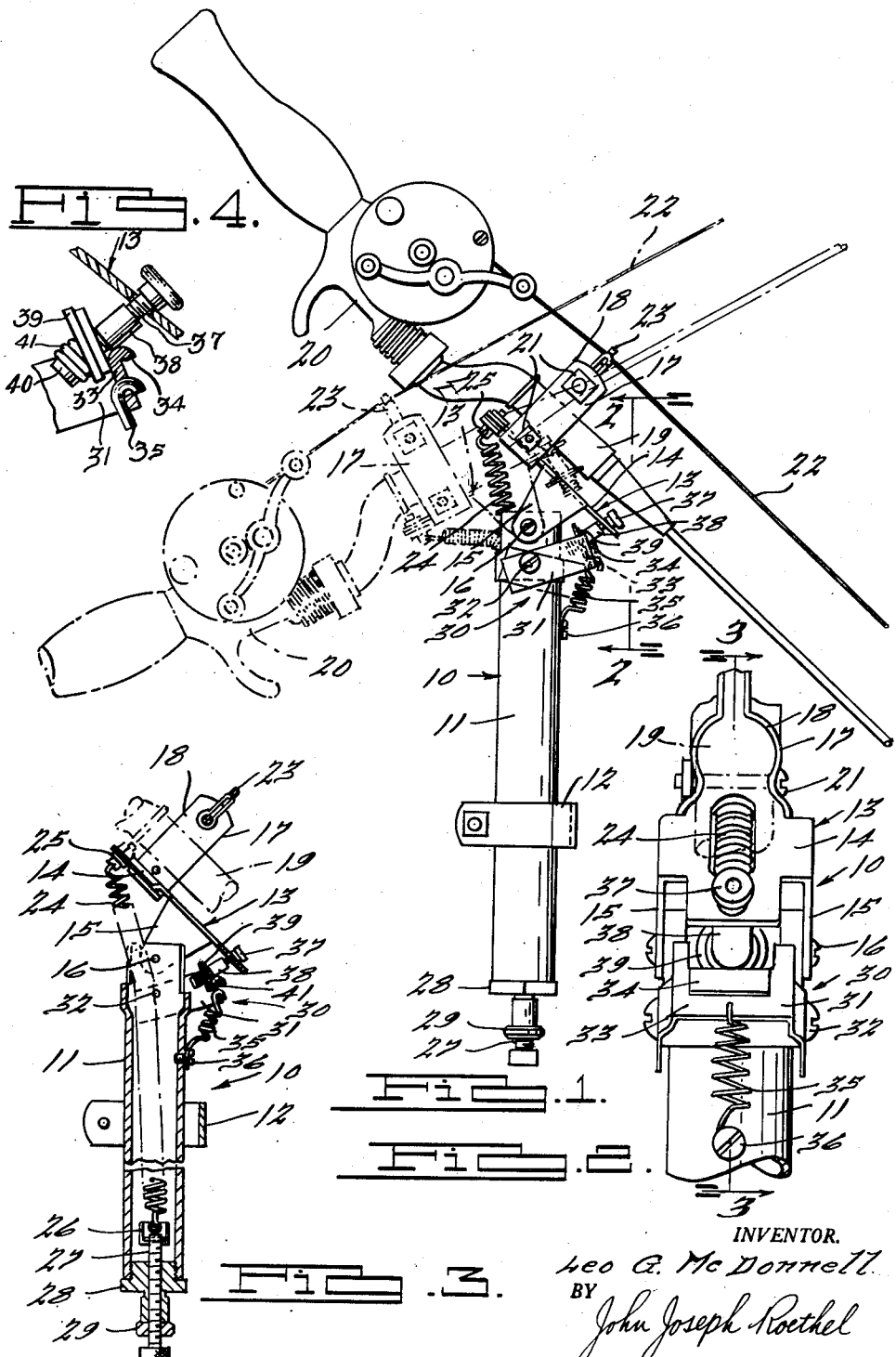

2,781,600

FISHING ROD SUPPORT

Leo G. McDonnell, Detroit, Mich.

Application June 3, 1955, Serial No. 512,991

3 Claims. (Cl. 43—15)

This invention relates to an improved fishing rod holder having a reflex action mechanism adapted to be responsive to the impact of a fish striking a baited hook whereby the hook will be mechanically jerked with sufficient force to cause it to be impaled in the mouth of the fish.

It is an object of the present invention to provide a device of the foregoing type which is compact in size, efficient in action and relatively simple and inexpensive to manufacture in contradistinction to earlier devices which comprised bulky and cumbersome mechanisms. The construction and arrangement embodying the present invention comprises a hollow cylindrical support member adapted to be clamped to the gunwale of a boat or to a stake driven into the ground at the water's edge. Pivotedly supported at the upper end of the support is an abbreviated platform provided with clamping means adapted to releasably clamp a fishing rod thereon. Housed within the support cylinder is a tension spring operatively connected to the platform and adapted to be placed under tension when the patform is tilted to a predetermined position, that is, to place the fishing rod in fish catching position. The support and platform are provided with coacting retaining means for holding the platform in said predetermined position until a fish strikes the baited hook, whereupon the retaining means is automatically released and the platform and fishing rod thereon are swung through the action of the tension spring to cause the hook to be jerked upwardly and impaled in the mouth of the fish.

Other features, objects and advantages of the present invention will be apparent from the following description and appended claims, reference being had to the accompanying drawings forming a part of this specification wherein like reference numerals designate corresponding parts in the several views.

Fig. 1 is a side elevation of the device embodying the present invention and showing the mechanism in two positions thereof.

Fig. 2 is a view taken substantially along line 2—2 of Fig. 1 looking in the direction of the arrows.

Fig. 3 is a sectional view taken substantially along line 3—3 of Fig. 2 looking in the direction of the arrows.

Fig. 4 is an enlarged fragmentary view taken substantially within the encircled portion 4 of Fig. 3.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the embodiment of the invention illustrated in the drawing, the fishing rod support mechanism, generally designated 10, comprises a hollow cylindrical body member 11 which is adapted to be clamped by any convenient clamping bracket 12 to the gunwale of a boat or to a stake adapted to be driven into the ground near the water's edge. As illustrated, the body member 11 is adapted to be supported in a substantially upright or vertical position.

A fishing rod support platform 13 is pivotally mounted on the upper end of the body member 11 for swinging movement relative thereto. The platform comprises a flat member 14 having two spaced depending leg portions 15 adapted to straddle the upper end of the body member 11, the leg portions 15 being journalled on the body member 11 by a pivot stud or pin 16. It will be noted that the pivot pin 16 lies substantially on the longitudinal axis of the body member 11. At the left end thereof as viewed in Figs. 1 and 3, the platform 13 carries a clamping device 17. The clamping device 17 comprises a member having spaced upwardly extending clamping portions 18 contoured to embrace the stock 19 of a fishing rod 20. Spaced bolt and nut devices 21 are provided to draw the clamping portions 20 toward each other and in tight engagement with the fishing rod stock 19. To ensure that the fish line 22 will not become frayed by rubbing on the upper clamp bolt device 21, a guide eye 23 is provided which is mounted on the upper bolt device 21 so as to project above the clamping device 17. The fish line 22 is threaded through the guide eye 23.

An elongated tension spring 24 is housed within the body member 11. As best viewed in Fig. 3, the tension spring 24 is attached at its upper end to an anchor bolt 25 carried by the platform 13 outboardly of the clamping device 17. At its lower end the spring 24 is coupled to a swivel element 26 carried on the inner end of an adjusting bolt 27. The adjusting bolt 27 is threaded through a cap member 28 which closes the lower end of the body member 11. A jam nut 29 is provided to lock the adjusting bolt 27 in its desired position of adjustment. It will be readily apparent that the pre-load tension on the tension spring 24 may be increased or decreased as desired by turning the adjusting bolt 27 in the appropriate direction.

An important feature of the present invention is the catch mechanism, generally designated 30, whereby the platform 13 is releasably held in a fish catching position. The catch mechanism 30 comprises a substantially U-shaped latch element 31 pivotedly mounted on a pivot pin 32 carried by the body member 11 below the platform pivot stud 16. The base section 33 of the U-shaped latch element 31 is provided with a reinforced lip portion 34. Referring to Fig. 1, it will be noted that the latch element 31 has a limited range of movement from its dotted line position to the solid line position. A tension spring 35 is provided to yieldably urge the latch element to its dotted line position, as will be more fully explained. As illustrated, the tension spring 35 is connected to the latch element below the lip portion 34 thereon and also to the body member at 36.

At its right or forward end as viewed in Figs. 1 and 3, the platform 13 is provided with a depending capped pin or stud 37. The stud 37 is loosely carried by the platform so that it has limited universal movement relative thereto. Beneath the platform surface the stud 37 carries a spacer collar 38 and beneath the spacer a pair of washer elements 39. Interposed between the washer elements and the lower capped end 40 of the stud is a compression spring 41 normally tending to urge the washer elements 39 and spacer upwardly against the bottom of the platform.

In operation the foregoing described device functions as follows:

It will be assumed that the device is in an inoperative position, that is, as shown in dotted outline in Fig. 1. To place the device in fish catching condition the following must be done: The fishing rod 20 as well as the support platform 13 on which it rests must be rotated in a clockwise direction from said dotted outline position to the solid outline position shown in Fig. 1. Next, the latch element 31 must be swung in a counterclockwise direction so that the reinforced lip portion 34 thereon will catch over the washer or flange elements 39. When this occurs the compression spring 41 beneath the elements 39 will compress slightly permitting the support platform 13 to be restored slightly in the direction of its original position under the urging of the main tension spring 24. The latch element spring 35 is also under tension when the latch element 31 is engaged with the washer or flange elements 39. However, the tension of the spring 35 is normally insufficient to cause disengagement of the latch element 31 from the washer or flange elements 39 when the elements of the device are in the solid outline position shown in Fig. 1. When in such position, the parts of the device are in condition to be automatically actuated upon a fish striking the bait carried on the fish hook.

When a fish strikes the bait carried by the fish hook, the fishing rod 20 as well as the support platforms 13 will be moved a slight degree in a clockwise direction and against the tension of the main spring 24. As a result of such movement, the frictional binding of the washer or flange elements 39 with the reinforced lip portion 34 of the latch element 31 will be released sufficiently to permit the spring 35 to retract the latch element 31 and restore the same to its original non-operative position. Disengagement of the latch element from the washers or flange elements 39 permits the main spring 24 to cause the support platform 13 as well as the fishing rod 20 mounted thereon to snap in a counterclockwise direction, as viewed in Fig. 1. The whip action of the free or hook end of the fishing rod will cause the hook to be jerked upwardly and impaled within the mouth of the fish.

It will be understood that the reel on the fishing rod is set on a drag position so as to give the mechanism full opportunity to disengage after the fish strikes the bait. It will be further understood that after the fish has been hooked through the action of the present device, the body member 11 may be hand held to play the fish into possession. Accordingly, a handleless fishing rod 20 may be attached to the support mechanism 10 without impairing the maneuverability of the fishing rod.

The adjusting bolt 27 provides a convenient means for adjusting the tension of the main spring which in turn affects the degree of action obtained at the free end or hook end of the fishing rod. When fishing for soft mouthed fish the tension of the main spring will be adjusted so that the action is not quite as firm as when fishing for hard mouthed fish. The easier action will prevent the fish hook from being torn right through the mouth of the fish in the case of soft mouthed fish, and by increasing the tension, the fisherman will be assured that the fish hook will be impaled within the mouth of the hard mouthed variety of fishes.

As apparent from the drawing, the structure involved in the present invention is rather compact thus having the advantage that it will easily fit within the fishing tackle box. The device has no parts that must be disassembled or telescoped in order to provide a compact structure for carrying purposes.

I claim:

1. A fishing rod holder comprising a tubular support column, a tiltable platform pivoted on the upper end of said column, the pivot axis of said platform being located substantially on the longitudinal axis of said column, a tension spring substantially housed within said column and operatively connected at its upper end to said platform at one side of the longitudinal axis of said column, said tension spring normally urging said platform into a first position wherein a fishing rod mounting thereon would be inclined with its handle end lower than the tip end thereof, and coacting means carried by said column and platform at the other side of the longitudinal axis of said column engageable to maintain said platform in a second position wherein said fishing rod would be inclined with its handle end higher than the tip end thereof, said coacting means including a latch element mounted on said column, a first spring means normally maintaining said latch element in a retracted position, latch element engaging means carried by said platform, said engaging means including a catch element, a second spring means normally maintaining said catch element in a non-operative position, said catch element being displaced from said non-operative position when coacting with said latch element to maintain said platform in said second position, said first spring means being effective to restore said latch element to retracted position and said second spring means being effective to restore said catch element to non-operative position upon movement of said platform beyond said second position thereby to disengage said coacting means and permit said tension spring to swing said platform from said second position to said first position.

2. A fishing rod holder comprising a tubular substantially upright support column, a tiltable platform pivoted on the upper end of said column, the pivot axis being located substantially on the longitudinal axis of said column, a tension spring substantially housed within said column and operatively connected at its upper end to said platform at one side of the pivot axis thereof, said tension spring normally urging said platform into a first position wherein a fishing rod mounted thereon would be inclined with its handle end lower than the tip end thereof, adjusting means carried by said column and operatively connected to the lower end of said tension spring for selectively adjusting the tension thereof, and coacting means carried by said column and platform at the other side of the pivot axis of said platform engageable to maintain said platform in a second position wherein said fishing rod would be inclined with its handle end higher than the tip end thereof, said coacting means including a latch element pivotally mounted on said column, a first spring means normally maintaining said latch element in a retracted position, latch element engaging means carried by said platform, said engaging means including a catch element, a second spring means normally maintaining said catch element in a non-operative position, said catch element being displaced from said non-operative position when coacting with said latch element to maintain said platform in said second position, said first spring means being effective to restore said latch element to retracted position and said second spring means being effective to restore said catch element to non-operative position upon movement of said platform beyond said second position thereby to disengage said coacting means and permit said tension spring to swing said platform from said second position to said first position.

3. A fishing rod holder comprising a tubular support column, a tiltable platform pivoted on the upper end of said column, the pivot axis of said platform being located substantially on the longitudinal axis of said column, a tension spring substantially housed within said column and connected at its upper end to said platform at one side of the pivot axis thereof, said tension spring normally urging said platform into a first inclined position wherein a fishing rod mounted thereon would be inclined with its handle end lower than its tip end, and latch means carried by said column and platform effective to maintain said platform in a second inclined position against the tension of said spring wherein said fishing rod would be inclined with its handle end higher than its tip end, said latch means including a latch element mounted on said column, a first spring means normally urging said latch element from a latched to an unlatched position, and latch element engaging means carried by said platform, said latch element engaging means including a catch element, and a second spring means normally maintaining said catch element in non-operative position, said latch element being engageable by said catch element upon movement of said platform to a further inclined position beyond said second inclined position and movement of said latch element to latched position, said second spring means permitting said catch element to be displaced from said non-operative position to an operative position, such displacement movement permitting said platform to assume said second inclined position and said latch means to be placed in triggered condition whereby upon movement of said platform again to said further inclined position said latch element will become disengaged from said catch element, said tension spring then being effective to restore said platform to said first inclined position.

References Cited in the file of this patent

UNITED STATES PATENTS

| | | |
|---|---|---|
| 2,618,090 | Kimura | Nov. 18, 1952 |
| 2,689,426 | Baenen | Sept. 21, 1954 |

FOREIGN PATENTS

| | | |
|---|---|---|
| 509,012 | France | Oct. 29, 1920 |